April 7, 1959 T. A. McCOY 2,880,610
SEALING UNIT FOR DRUM TESTERS
Filed Nov. 16, 1956 2 Sheets-Sheet 1
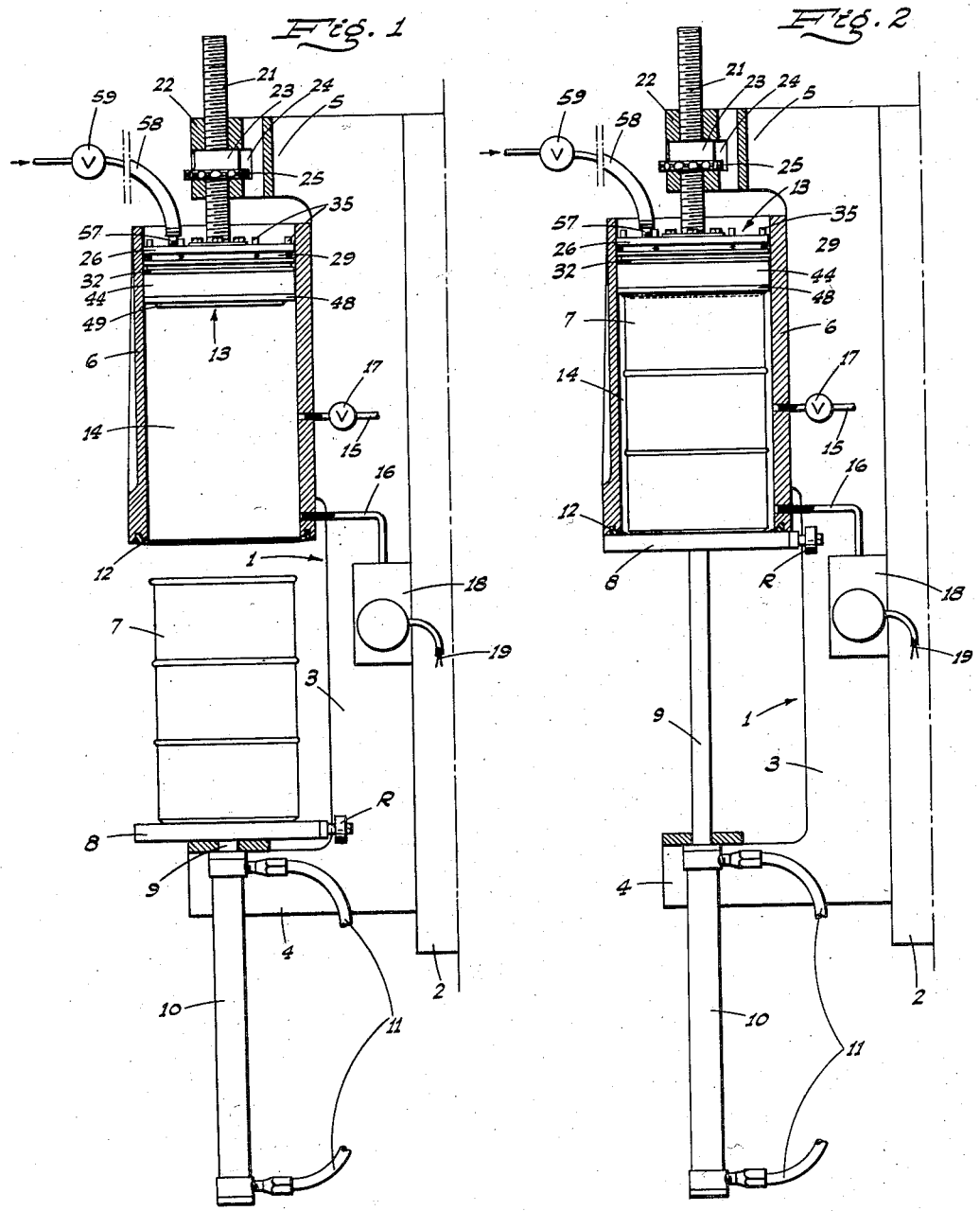
INVENTOR.
Thomas A. McCoy
BY Webster & Webster
ATTYS.

April 7, 1959 T. A. McCOY 2,880,610
SEALING UNIT FOR DRUM TESTERS
Filed Nov. 16, 1956 2 Sheets-Sheet 2
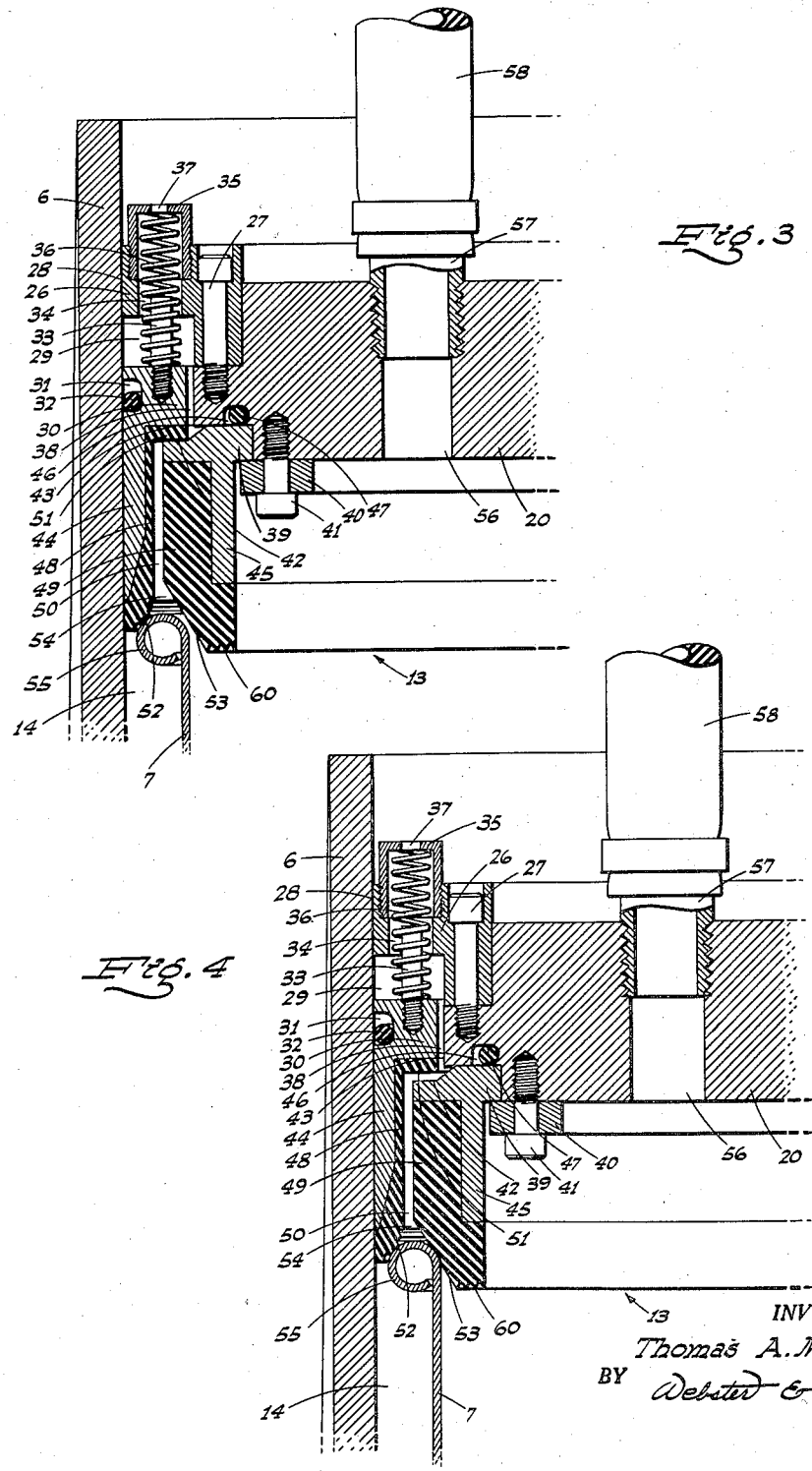
INVENTOR.
Thomas A. McCoy
BY Webster & Webster
ATTYS.

United States Patent Office 2,880,610
Patented Apr. 7, 1959

2,880,610

SEALING UNIT FOR DRUM TESTERS

Thomas A. McCoy, Stockton, Calif., assignor to Carando Machine Works, Stockton, Calif., a partnership Application November 16, 1956, Serial No. 622,573

9 Claims. (Cl. 73—49.2)

This invention relates in general to improvements in a machine of the type employed to test initially open-topped metallic drums (or cans) for leakage; such a machine including an air-tight testing chamber in which the drum is disposed, with the initially open top closed and sealed off by what may be termed a "sealing unit." Air under pressure is then introduced into the drum, and—with the chamber initially at atmospheric pressure about the drum—any rise in such latter pressure, and as evidenced by a suitable detection unit, indicates leakage from the drum, and it is then rejected.

The present invention is directed to—and it is a major object to provide, in a drum testing machine as above—a novel and improved sealing unit for closing and sealing off the initially open top of the drum to be tested, whereby to prevent—at said top—the relatively higher air pressure, as introduced into the drum, from escaping into the testing chamber about said drum, and which occurrence would prevent a proper test; i.e., would cause the detection unit to indicate a leak in the drum whether or not such a defect actually existed.

Another important object of the invention is to provide a sealing unit, as above, which includes sealing means, of novel structure, arranged so that if any of said relatively higher air pressure in the drum escapes about the inner portion of the bead or rim at the top of the drum, such escaped air is bled off to atmosphere exteriorly of the testing chamber; thus preventing such escaping relatively higher pressure from continuing about said bead and entering the testing chamber, with the undesirable result previously mentioned.

An additional object of the invention is to provide a sealing unit for a drum testing machine wherein said unit comprises the closure for one end of a tubular or cylindrical body into which the drum is inserted from the other end; the latter being closed by a vertically movable or elevator platform on which the drum is initially seated in spaced relation below said body. The tubular body, said sealing unit, and the elevator platform when in a raised position, define the closed testing chamber.

Still another object of the invention is to provide a practical, reliable, and durable sealing unit for drum testers, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, somewhat in outline and partly in section, showing a drum testing machine embodying the novel sealing unit; the elevator platform being shown in lowered position with a drum seated thereon.

Fig. 2 is a similar view, but shows the elevator platform as raised to a position closing the lower end of the tubular or cylindrical body, and with the drum disposed in said body in engagement at the top with said sealing unit.

Fig. 3 is an enlarged fragmentary radial sectional elevation of the sealing unit, with the parts thereof in their initial or starting position; the top of a drum being inserted into the tubular or cylindrical body being shown as initially engaging the outer seal.

Fig. 4 is a similar view, but shows the parts of the sealing unit in the positions occupied thereby upon full insertion of a drum into the tubular or cylindrical body, and engagement of said drum at the top with both of the seals.

Referring now more particularly to the drawings, and to the characters of reference marked thereon, the present invention is embodied in a drum testing machine of the type shown in Figs. 1 and 2, and which includes a vertically elongated, C-shaped mount, indicated generally at 1, affixed to a support 2; the mount 1 including a post 3, a lower laterally outwardly projecting arm 4, and an upper laterally outwardly projecting arm 5.

Adjacent but below the arm 5 the post 3 is fixed to, and supports, a vertically disposed tubular or cylindrical body 6 whose lower end terminates above the arm 4 a distance greater than the length of an open-topped drum 7 to be tested.

Such drum 7 is initially seated on a lowered, elevator platform 8 disposed closely adjacent arm 4 and fixed to the upper end of the piston rod 9 of a double-acting fluid pressure power cylinder 10 fixed in connection with said arm 4 and depending therebelow.

The power cylinder 10 is actuated by means of a reversible, valve-regulated, fluid pressure conduit system, shown here only in part at 11.

Upon actuation of the power cylinder 10 to raise the elevator platform 8, which motion is guided by rollers R, the drum 7—open at the top—is carried upwardly until it is disposed wholly within the body 6; the lower end of said body then sealing with the upper face of the platform 8, and which is accomplished by an annular resilient seal 12 secured in said lower end of the body 6.

When the elevator platform 8 thus abuts and seals with the lower end of the body 6, with the drum 7 wholly within the latter, the initially open top of said drum is engaged with a sealing unit, indicated generally at 13, which forms the closure for the upper end portion of the body 6.

The drum 7 is then contained in an air-tight testing chamber 14 defined by body 6, platform 8, and sealing unit 13; there being two conduits, indicated at 15 and 16, connected to the body 6 and leading from the chamber 14. One of such conduits includes a valve 17, while the other conduit is coupled to a pressure-rise detection unit 18 which preferably is in the form of a pressure-responsive switch unit from which circuit wires 19 lead to an electric signal, or—in an automatic machine—to an electro-mechanical, drum rejection device; neither the signal nor the device being here shown.

The sealing unit 13, which is shown in detail in Figs. 3 and 4, comprises a circular head plate 20 of somewhat lesser outside diameter than the inside diameter of the tubular or cylindrical body 6; such head plate being attached (see Figs. 1 and 2) to the inner end of a central or axially projecting adjustment screw 21 which extends in slidable relation through a boss 22 on the upper arm 5. The screw 21 is run upwardly or downwardly—to adjust the position of the sealing unit 13 in body 6— by means of a nut 23 threaded on screw 21 and riding in a slot 24 in boss 22; such nut 23 being formed with a radial wheel 25 to aid in adjustment of said nut.

At the periphery, and adjacent the top, the circular head plate 20 is fitted with a locator and guide ring 26 secured to said plate by screws 27; such locator and guide ring 26 slidably engaging the inner wall of body 6, as at 28. The lower and outer corner of the guide ring 26 is notched to define an annular, outwardly and downwardly opening recess 29.

An outer slide ring 30 surrounds the circular head plate 20 intermediate the top and bottom of the latter and directly below the annular recess 29; such slide ring 30 being peripherally grooved, as at 31, and an O-ring seal 32 being disposed in groove 31 and having sealing engagement with the inner wall of the body 6.

A multiplicity of circumferentially spaced pins 33 are threaded into the slide ring 30 and project vertically upwardly therefrom into corresponding bores 34 in the guide ring 26; there being inverted cups 35 threaded into the upper portion of said bores 34.

A compression spring 36 surrounds each pin 33 and engages at the lower end against the slide ring 30, and at the upper end against the top of the related inverted cup 35.

The top of each inverted cup 35 is formed with a vent 37, and the outside diameter of the head plate 20 and the inside diameter of the slide ring 30 are such as to define an annular passage 38 therebetween; all for the purpose as will hereinafter appear.

Said circular head plate 20 is peripherally notched at the lower corner, and there receives a fixed inner ring 39 held in place by a retainer 40 secured by screws 41; such fixed ring 39 including a radially outwardly extending, upwardly facing annular shoulder 42 which lies initially in adjacent but spaced relation below—or in lapping relation to—a radially inwardly extending, downwardly facing annular shoulder 43 formed by the slide ring 30.

Adjacent its periphery said slide ring 30 includes—in integral relation—a depending annular skirt 44 having sliding engagement with the inner wall of the body 6, while the fixed ring 39 on head plate 20 includes—in integral relation—a depending annular skirt 45 offset radially inwardly with respect to the shoulder 42.

A seal between the fixed ring 39 and the head plate 20 is accomplished by forming an annular groove 46 in the latter and providing an O-ring seal 47 in said groove in engagement with the fixed ring 39.

The depending annular skirt 44 of the slide ring 30 and the depending annular skirt 45 of the fixed ring 39 are fitted—on adjacent faces—with annular seals, indicated at 48 and 49, respectively. Such outer seal 48 and the inner seal 49 are disposed in radially spaced relation, whereby to define an annular passage therebetween; said passage being indicated at 50.

At the upper end the outer seal 48 is formed with a radially inwardly extending lip or flange 51 which underlies the shoulder 43, being suitably adhered thereto; such lip or flange 51 normally bearing atop the shoulder 42 of the fixed ring 39.

The outer seal 48 is formed—at its lower portion—with a downwardly and outwardly tapered, circumferentially corrugated face 52, while the inner seal 49 is formed—at its lower portion—with a downwardly and inwardly tapered, smooth face 53; the faces 52 and 53 forming, in effect, an annular upwardly tapering channel 54 adapted for the reception of the bead or rim 55 of a drum 7 fully inserted into the tubular or cylindrical body 6 by the elevator platform 8.

The circular head plate 20 is formed—at one point thereon, and radially inwardly from the guide ring 26—with a through bore 56 into which a fitting 57 is threaded; an air pressure supply conduit 58 being coupled to said fitting 57. A valve 59 is interposed in the conduit 58, as shown in Figs. 1 and 2.

The seals 48 and 49 are preferably formed of heavy-duty rubber, or a like synthetic material, which is relatively stiff but resilient.

Operation

With the sealing unit 13 first adjusted to a selected position in the tubular or cylindrical body 6, and which position is predetermined by the axial length of the drum 7 to be tested, said drum is fully inserted into the body 6 by raising of the elevator platform 8, and until it seals with the lower end of said body.

Upon the drum thus being inserted into the body 6, and by reason of the particular angular relationship and disposition of the faces 52 and 53, the bead or rim 55, at the open top of said drum, first engages (see Fig. 3) the downwardly and outwardly tapered corrugated face 52 of the outer seal 48 and pushes the latter, together with the slide ring 30, upwardly a relatively short distance; such movement being yieldably resisted by the compression springs 36.

When this occurs the lip or flange 51 of the outer seal 48 raises off of the shoulder 42 of the fixed ring 39, whereby communication is established between the annular passages 50 and 38.

Thereafter, with continued but slight further upward movement of the drum 7 (which occurs as the platform 8 finally comes to reset against the lower end of the body 6) the bead or rim 55 engages and bears with considerable force against the downwardly and inwardly tapered face 53 of the inner seal 49 (see Fig. 4).

With the drum 7 enclosed in the air-tight testing chamber 14, and with the bead or rim 55 engaging the faces of the outer seal 48 and inner seal 49, as above described, the valve 17 is opened in order to establish atmospheric pressure in the chamber 14 about the drum 7; such valve 17 then being closed.

Next, air under pressure is introduced through conduit 58—by opening valve 59—and flows through bore 56 into the then top sealed drum 7. If such drum is sound, none of the relatively higher air pressure in the drum escapes into the chamber 14, so that the pressure rise detection unit 18 remains inactive.

However, the drum 7 has a leak therein, the relatively higher air pressure from within the drum will bleed into the testing chamber 14, raising the pressure therein and causing the detection unit or pressure responsive switch 18 to close. When this occurs a signal is given which indicates to the operator that the drum leaks, or—if in an automatic machine—the switch causes actuation of a drum rejecting mechanism.

During the testing of a drum 7 in the chamber 14 the relatively higher air pressure in said drum cannot leak about the bead or rim 55 from said drum to the chamber 14, by reason of the effective seal which the unit 13 provides. More specifically, if any of such relatively higher air pressure in the drum should leak between the inner portion of the bead or rim 55, and the face 53 of the inner seal 49, the leakage of such pressure does not gain access into the testing chamber 14, but contrariwise is bled out through the then communicating passages 50 and 38, into recess 29, through bores 34, and cups 35; finally escaping from the vents 37. This bleeding-off of any such escaping relatively higher air pressure effectively prevents such pressure from passing between the corrugated face 52 of the outer seal 48, and the engaged outer portion of the bead or rim 55. Here it should be noted that engagement of face 52 with the bead or rim 55 is always positively maintained by the loading of the compression springs 36, and which springs tend to slide the ring 30 downwardly.

Certain types of drums (or cans) have an in-place top, but with a central opening therein, so that testing of such type of drum can be accomplished in substantially the same manner as with a wholly open-topped drum; this as long as a seal is made with such top about said central opening. To accomplish this, the inner seal 49 is formed at the lower edge with a corrugated face 60 adapted to bear on said top when the drum is in place in the body 6.

As employed in a drum testing machine of the type described, the sealing unit 13 is wholly effective to top-seal a drum being tested in the chamber 14, and yet the structural arrangement of said sealing unit is such that it is relatively inexpensive to manufacture, can be readily installed in such a machine, and will thereafter give long service with a minimum of maintenance or replacement of parts.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a machine for testing a drum, initially open at one end, in an enclosed chamber wherein a sealing unit closes said one end and seals the same against transfer of relatively higher pressure from within the drum into said chamber; the drum having an annular bead on said one end, and the sealing unit including a head plate, and an annular seal assembly mounted in connection with the head plate, the seal assembly defining an annular channel in which the bead seats and having annular inner and outer seals engaging corresponding portions of the bead; there being a pressure venting passage leading from the bottom of said channel to exteriorly of the chamber.

2. A sealing unit, as in claim 1, in which the chamber includes a cylindrical body; a ring slidable therein adjacent the head plate, the outer seal being carried by the slide ring, and means yieldably resisting motion of the slide ring in a direction away from the drum; the ring being moved in such direction by the bead engaging the outer seal when the drum is enclosed in the chamber, and means initially closing said passage but opening the same upon such movement of the ring.

3. In a machine for testing a drum, initially open at one end, in an enclosed chamber wherein a sealing unit closes said one end and seals the same against transfer of relatively higher pressure from within the drum into said chamber; the chamber including a cylindrical body, the drum having an annular bead at said one end, and the sealing unit comprising a circular head plate supported in the cylindrical body, an outer ring slidable in the body, an inner ring secured to the head plate, annular outer and inner seals on the corresponding rings, said seals being disposed and formed to define an annular channel in which the bead seats, and means between the head plate and slide ring yieldably urging the latter toward the drum.

4. In a machine for testing a drum, initially open at one end, in an enclosed chamber wherein a sealing unit closes said one end and seals the same against transfer of relatively higher pressure from within the drum into said chamber; the chamber including a cylindrical body, the drum having an annular bead at said one end, and the sealing unit comprising a circular head plate supported in the cylindrical body, an outer ring slidable in the body, an inner ring secured to the head plate, annular outer and inner seals on the corresponding rings, said seals being disposed and formed to define an annular channel in which the bead seats, the rings having radially extending and overlapping shoulders, one seal including an annular portion extending radially across the related shoulder, and spring means between the head plate and slide ring yieldably urging the latter in a direction toward the drum; said last named means initially disposing the slide ring with said annular portion of one seal engaged between said shoulders but yielding to break such engagement when the bead is seated in said channel and moves the outer seal and slide ring in the opposite direction; there being passage means then opened to atmosphere from said channel.

5. In a machine for testing a drum, initially open at one end, in an enclosed chamber wherein a sealing unit closes said one end and seals the same against transfer of relatively higher pressure from within the drum into said chamber; the chamber including a cylindrical body, the drum having an annular bead at said one end, and the sealing unit comprising a circular head plate supported in the cylindrical body, an outer ring slidable in the body, an inner ring secured to the head plate, annular outer and inner seals on the corresponding rings, said rings and seals being formed and disposed to define both an annular channel in which the bead seats and a passage leading to atmosphere from the bottom of said channel, means between the head plate and slide ring yieldably urging the latter in a direction toward the drum, and cooperating elements on the rings initially closing said passage but opening the latter when the bead is seated in said channel and moves the outer seal and slide in the opposite direction.

6. In a machine for testing a drum, initially open at one end, in an enclosed chamber wherein a sealing unit closes said one end and seals the same against transfer of relatively higher pressure from within the drum into said chamber; the chamber including a cylindrical body, the drum having an annular bead at said one end, and the sealing unit comprising a circular head plate supported in the cylindrical body, an outer ring slidable in the body, an inner ring secured to the head plate, annular outer and inner seals on the corresponding rings, the ends of said seals adjacent the drum being tapered to define an annular channel of generally inverted V-shape transversely, the bead seating in such channel, and spring means between the head plate and slide ring yieldably urging the latter and the outer seal in the direction of the drum.

7. A sealing unit, as in claim 6, in which the slide ring and outer seal are moved a certain distance in the opposite direction when the bead is seated in the channel; there being a passage opened to atmosphere from the bottom of said channel when the slide ring and outer seal are so moved.

8. In a machine for testing a drum, initially open at one end, in an enclosed chamber wherein a sealing unit closes said one end and seals the same against transfer of relatively higher pressure from within the drum into said chamber; the chamber including a cylindrical body, the drum having an annular bead at said one end, and the sealing unit comprising a circular head plate supported in the cylindrical body, a locator and guide ring on the periphery of the head plate having a sliding fit in the body, means to adjust the head plate axially in the body, a slide ring in the body spaced from said locator and guide ring, spring means between said rings yieldably resisting movement of the slide ring toward the locator and guide ring, another ring mounted on the head plate adjacent the slide ring, said slide ring and other ring having annular skirts disposed in spaced but facing relation and extending toward the drum, an outer annular seal on the slide ring skirt, and an inner annular seal on the skirt of said other ring, the faces of the seals adjacent the drum being tapered to define an inverted V-shaped channel in which the bead is seated; the slide ring and outer seal being moved against the spring means and in the direction of said locator and guide ring when the bead is seated in said channel, and there being a passage opened to atmosphere from the bottom of said channel when the slide ring and outer seal are so moved.

9. A sealing unit, as in claim 8, in which the slide ring and other ring, together with the corresponding outer and inner seals are radially spaced to define such passage; overlapping shoulders on said slide ring and other ring, and a seal carried by one shoulder and intially bearing against the other whereby to close said passage; said shoulders separating and the passage being opened when the slide ring and outer seal are so moved.

References Cited in the file of this patent

UNITED STATES PATENTS

| 2,020,535 | Cameron | Nov. 12, 1935 |
| 2,667,062 | Johns | Jan. 26, 1954 |